United States Patent
Frantz et al.

(10) Patent No.: US 10,884,188 B2
(45) Date of Patent: Jan. 5, 2021

(54) ANTIREFLECTIVE SURFACE STRUCTURES FOR ACTIVE AND PASSIVE OPTICAL FIBER

(71) Applicant: The Government of the United States of America, as represented by the Secretary of the Navy, Arlington, VA (US)

(72) Inventors: Jesse A. Frantz, Washington, DC (US); Lynda E. Busse, Alexandria, VA (US); Jason D. Myers, Alexandria, VA (US); L. Brandon Shaw, Woodbridge, VA (US); Jasbinder S. Sanghera, Ashburn, VA (US); Ishwar D. Aggarwal, Waxhaw, NC (US); Catalin M. Florea, Washington, DC (US)

(73) Assignee: The Government of the United States of America, as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 15/931,908

(22) Filed: May 14, 2020

(65) Prior Publication Data
US 2020/0271862 A1    Aug. 27, 2020

Related U.S. Application Data

(62) Division of application No. 16/185,219, filed on Nov. 9, 2018, now Pat. No. 10,663,667, which is a division
(Continued)

(51) Int. Cl.
*G02B 6/26* (2006.01)
*C03C 25/68* (2006.01)
(Continued)

(52) U.S. Cl.
CPC .............. *G02B 6/262* (2013.01); *C03C 25/68* (2013.01); *G02B 5/0268* (2013.01);
(Continued)

(58) Field of Classification Search
CPC ...... C03C 25/68; G02B 6/262; G02B 5/0268; G02B 5/1857; G02B 6/3584
(Continued)

(56) References Cited

U.S. PATENT DOCUMENTS 5,961,849 A * 10/1999 Bostock .................. G02B 6/30
216/2
2003/0072538 A1* 4/2003 Jin ....................... G02B 6/4225
385/89
(Continued)

*Primary Examiner* — Binh X Tran
(74) *Attorney, Agent, or Firm* — US Naval Research Laboratory; Rebecca Forman

(57) ABSTRACT

A method for creating a random anti-reflective surface structure on an optical fiber including a holder configured to hold the optical fiber comprising a groove and a fiber connector, an adhesive material to hold the optical fiber in the holder and fill any gap between the optical fiber and the holder, a glass to cover the adhesive material and the optical fiber, and a reactive ion etch device. The reactive ion etch device comprises a plasma and is configured to expose an end face of the optical fiber to the plasma. The plasma is configured to etch a random anti-reflective surface structure on the end face of the optical fiber.

3 Claims, 10 Drawing Sheets

Related U.S. Application Data of application No. 15/166,301, filed on May 27, 2016, now Pat. No. 10,126,504.

(60) Provisional application No. 62/166,802, filed on May 27, 2015.

(51) Int. Cl.
    *G02B 5/02*         (2006.01)
    *H05H 1/46*        (2006.01)
    *G02B 5/18*         (2006.01)
    *G02B 6/35*         (2006.01)

(52) U.S. Cl.
    CPC ......... *G02B 5/1857* (2013.01); *G02B 6/3584* (2013.01); *H05H 1/46* (2013.01); *C03C 2218/34* (2013.01); *H05H 2001/4645* (2013.01)

(58) Field of Classification Search
    USPC .................................................. 216/7, 24, 67
    See application file for complete search history.

(56) References Cited

U.S. PATENT DOCUMENTS

| | | | |
|---|---|---|---|
| 2006/0159402 A1* | 7/2006 | Ammer | G02B 6/3809 385/71 |
| 2010/0000260 A1* | 1/2010 | Sandoz | G02B 6/02 65/399 |
| 2012/0116255 A1* | 5/2012 | Wang | G02B 6/30 600/587 |
| 2012/0234458 A1* | 9/2012 | Yoda | H01L 24/83 156/64 |
| 2013/0022323 A1* | 1/2013 | Takizawa | G02B 6/4233 385/92 |
| 2014/0029890 A1* | 1/2014 | Sun | G02B 6/4249 385/14 |
| 2017/0102508 A1* | 4/2017 | Yoda | G02B 6/4221 |

* cited by examiner

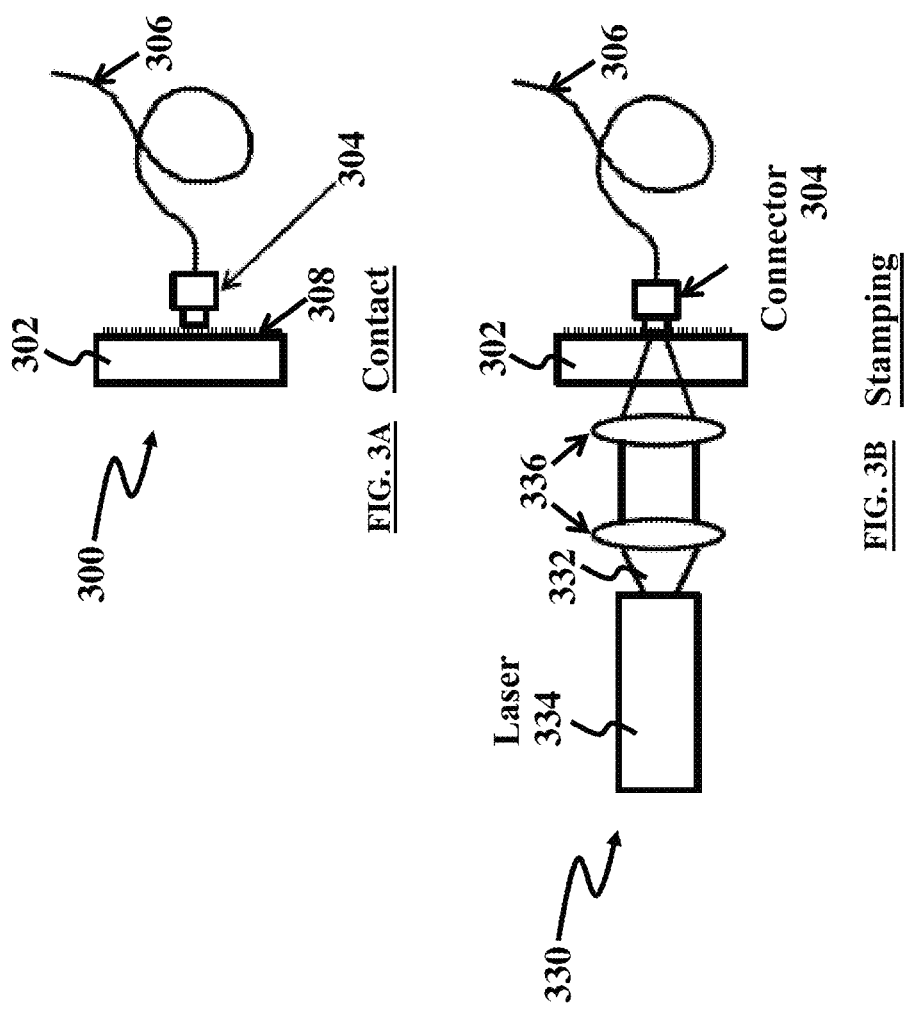

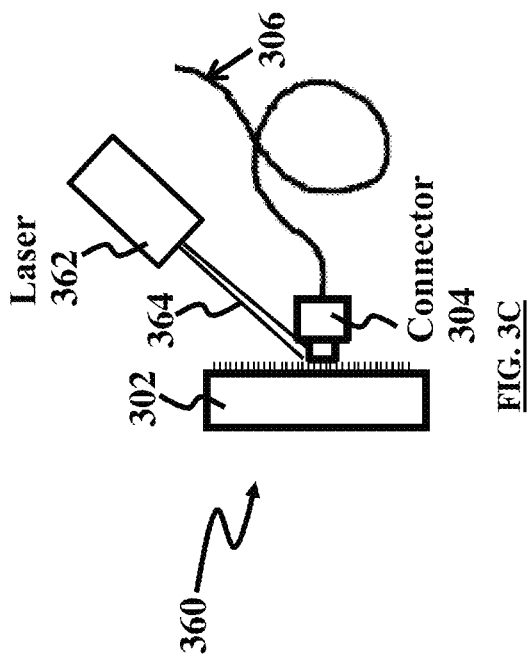
FIG. 3C
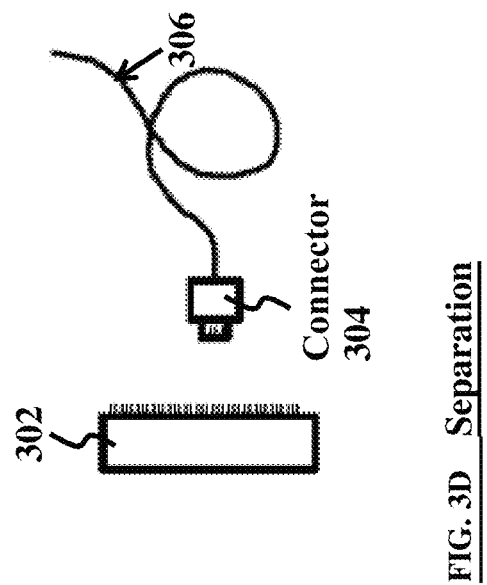
FIG. 3D Separation

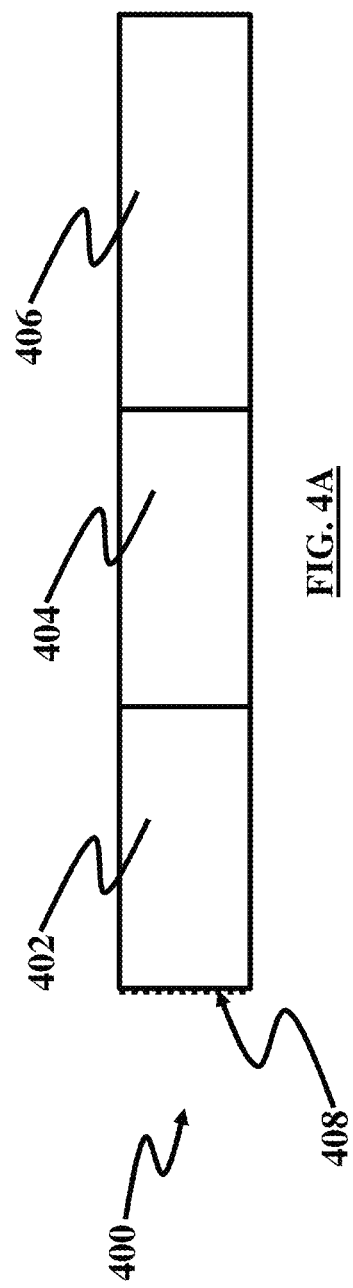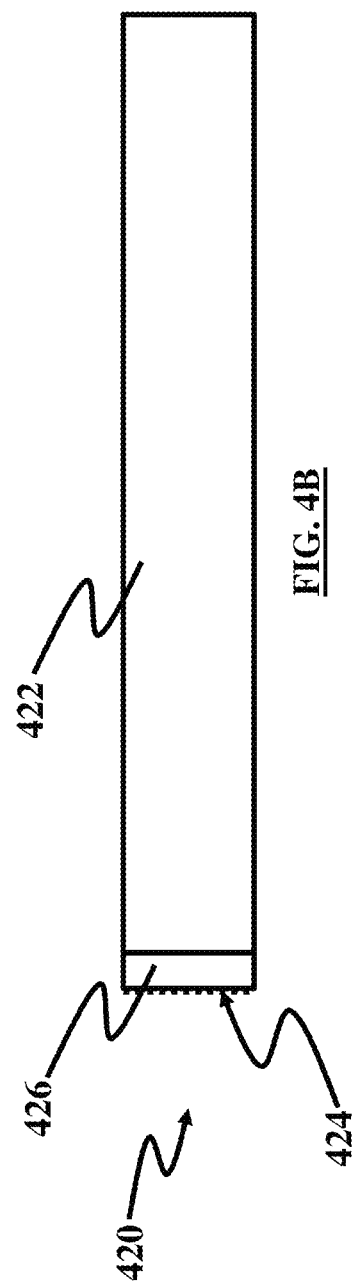

US 10,884,188 B2

ANTIREFLECTIVE SURFACE STRUCTURES FOR ACTIVE AND PASSIVE OPTICAL FIBER

CROSS-REFERENCE TO RELATED APPLICATIONS

The present application is a divisional application of U.S. application Ser. No. 16/185,219 filed on Nov. 9, 2018, which was a divisional application of U.S. application Ser. No. 15/166,301 filed on May 27, 2016, which claimed priority to U.S. Provisional Patent Application No. 62/166,802 filed on May 27, 2015, the entire contents of each are herein incorporated by reference.

GOVERNMENT INTEREST

The embodiments described herein may be manufactured, used, and/or licensed by or for the United States Government without the payment of royalties thereon.

BACKGROUND

Technical Field

The embodiments herein relate to optical systems, and more particularly to antireflective surfaces used in optical systems.

Description of the Related Art

In optical systems, Fresnel reflections from an optical surface have a variety of undesirable effects. These may include reduced transmittance, feedback into laser systems, stray reflections, and in the case of military applications, potential detection by enemy combatants. In bulk optics, Fresnel reflections are traditionally reduced using thin film dielectric stacks of materials with alternating high and low refractive indices. As a result of thin film interference effects, these stacks may be designed to behave as antireflective (AR) coatings for a range of wavelengths. Such coatings, however, may have several problems associated with them. For example, they may exhibit laser induced damage thresholds (LIDTs) significantly lower than those of the bulk optics, and may be subject to environmental degradations and delamination under thermal cycling, and may perform well only for a limited optical bandwidth and angular range. It is desirable to prevent these issues from occurring in an optical system.

SUMMARY

In view of the foregoing, an embodiment herein provides a system for creating an anti-reflective surface structure on an optical device, the system comprising a shim comprising a textured pattern, wherein the shim is configured to stamp the optical device with the textured pattern; a connector configured to place the optical device in proximity to the shim and apply a force to the optical device against the shim; and a laser source configured to heat the optical device by generating and applying a laser beam to the optical device when the optical device is placed in proximity to the shim.

The shim may comprise a transparent material, and wherein the laser source is placed on an opposite side of the shim than the optical device. The system may further comprise a pair of lenses configured to focus the laser beam on the optical device. The laser source may be located on the same side of the shim as the optical device. The laser beam may be applied to the optical device from an oblique angle. The shim may comprise a release layer comprising a non-adhesive material.

The release layer may comprise a thickness less than approximately 20 nm. The laser source may comprise a $CO_2$ laser source creating a wavelength of approximately 10.6 The optical device may comprise an optical fiber, and wherein the anti-reflective surface structure may be created on a tip of the optical fiber. The optical fiber may comprise any of silicate glass, oxide glass, halide glass, and chalcogenide glass, wherein the oxide glass may comprise any of aluminate, phosphate, germanate, tellurite, bismuthate, and antimonate glasses, wherein the halide glass may comprise any of halogen elements, including fluorine, chlorine, bromine, and iodine, and wherein the chalcogenide glass may comprise any of chalcogen elements including sulfur, selenium, and tellurium.

The optical fiber may comprise a single crystal comprising any of yttrium aluminum garnet (YAG), sapphire, magnesium aluminate spinel, gadolinium gallium garnet (GGG), and lithium niobate. The optical fiber may be doped with rare earth ions of elements comprising any of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), and ytterbium (Yb). The optical fiber may be doped with transition metal ions of elements comprising any of titanium (Ti), vanadium (V), chromium (Cr), manganese (Mn), iron (Fe), cobalt (Co), and nickel (Ni).

An embodiment herein provides a system for creating a random anti-reflective surface structure on an optical fiber, the system comprising a holder, configured to hold the fiber optic, wherein the holder comprises any of a groove and a fiber connector, and wherein the fiber connector comprises any of a SMA, FC, and ST type connector; an adhesive material configured to hold the optical fiber in the holder and fill a gap between the optical fiber and the holder, wherein the adhesive material comprises a temporary adhesive material configured to be removed; glass configured to cover the adhesive material and the optical fiber; and a reactive ion etch device comprising plasma and configured to expose an end face of the optical fiber to the plasma, wherein the plasma is configured to etch the random anti-reflective surface structure on the end face of the optical fiber.

The plasma may comprise any of fluoride ($F^-$), chloride ($Cl^-$), $C^{+4}$, oxide (O-2), $B^{+3}$, sulfite ($S^{-2}$), and argon (Ar) ions. The plasma may comprise an inductively coupled plasma (ICP). A pressure of the plasma may be maintained between approximately 15 and 100 mT, and wherein a gas flow of the plasma may be maintained between approximately 20 and 150 sccm. The etching may be carried out until a peak-to-valley surface roughness of the random anti-reflective surface structure is between approximately 150 nm and 2 The system may further comprise an etch mask on the tips of the plurality of fibers, wherein the etch mask may comprise a layer of metal comprising a thickness less than approximately 1,000 nm, and wherein the metal may comprise any of gold (Au), silver (Ag), titanium (Ti), aluminum (Al), and chromium (Cr).

An embodiment herein provides a method for creating a random anti-reflective surface structure on a plurality of optical fibers, the method comprising placing the plurality of optical fibers in a plurality of groves; holding the plurality of optical fibers in place using an adhesive; placing glass on the plurality of optical fibers; coating tips of the plurality of optical fibers with a layer of metal, wherein the metal comprises any of gold (Au), silver (Ag), titanium (Ti), aluminum (Al), and chromium (Cr); and exposing the tips of the plurality of optical fibers to a plasma, wherein the plasma comprises any of fluoride ($F^-$), chloride ($Cl^-$), $C^{+4}$, oxide ($O^{-2}$), $B^{+3}$, sulfite ($S^{-2}$), and argon (Ar) ions.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 3A is a schematic diagram illustrating a first part of a process for stamping antireflective surface structures (ARSSs) used on an optical fiber according to an embodiment herein;

FIG. 3B is a schematic diagram illustrating a second part of a process for stamping ARSS on an optical fiber according to an embodiment herein;

FIG. 3C is a schematic diagram illustrating a third part of a process for stamping ARSS on an optical fiber according to an embodiment herein;

FIG. 3D is a schematic diagram illustrating a fourth part of a process for stamping ARSS on an optical fiber according to an embodiment herein;

FIG. 4A is a schematic diagram illustrating an optical fiber with ARSS patterning according to an embodiment herein;

FIG. 4B is a schematic diagram illustrating an optical fiber with ARSS patterning according to another embodiment herein;

DETAILED DESCRIPTION

Figure 1A:
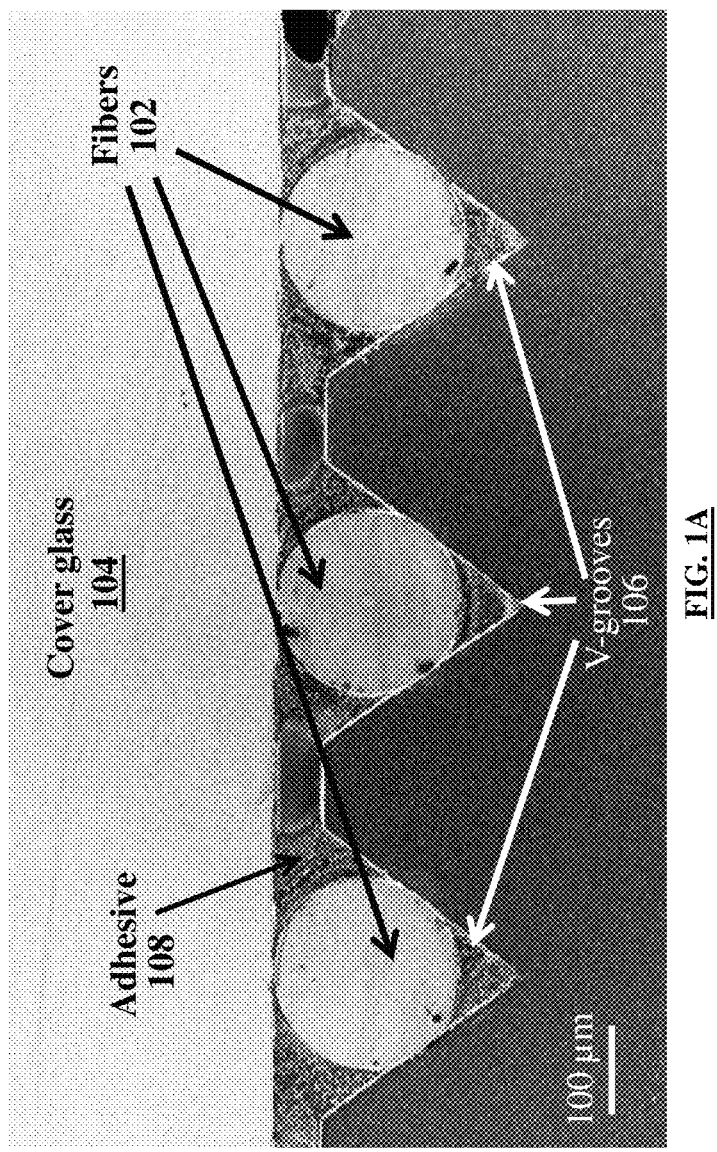
FIG. 1A is a scanning electron microscope (SEM) image of the end faces of fibers in a V-groove holder according to an embodiment herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

An approach for reducing Fresnel reflections while reducing the problems associated with traditional AR coatings is direct nano-patterning of ARSS on the surface of an optical material. Processing of these structures does not involve a permanent coating on the optic but instead relies on nano-patterning of the surface of the optical material itself. Nano-patterning of the surface may result in antireflective performance of ARSS comparable to that of the traditional AR coatings, while adding significant advantages such as higher laser damage thresholds, wide spectral bandwidths, and large acceptance angles.

ARSS structures may include providing a gradual transition in refractive index from one medium (medium A) to another (medium B). As light passes from A to B, the effective index in a given plane that is parallel to the interface between A and B increases from that of A to that of B, as more of the area of a given plane is composed of medium B. ARSS structures may include arrays of nanoscale structures in which the period of the pattern is designed to be on a sub-wavelength scale in order to avoid undesired diffraction effects, while the height of the individual features is on the order of one-half the wavelength, in order to simulate a graded index variation between air and the optical substrate. An ARSS may have an ordered, repeating pattern. This is typically the case when an ARSS is created photolithographically or stamped with a patterned shim. Alternately, a random ARSS (rARSS) may be created via an etch process.

Fiber tips may also be coated with AR dielectric stacks, as is the case with bulk optics. Similar to reflections from bulk optics, reflections from fiber end faces are problematic for a variety of applications due to reduced transmittance and feedback into laser systems. These problems are especially severe in the case of high power laser applications where AR coatings suffer from low LIDT and are subject to adhesion problems.

ARSS on fiber tips could provide AR performance while increasing LIDT and environmental stability. In an example, ARSS may be implemented on fiber tips in chalcogenide glass. The low softening point of these glasses (typically less than approximately 300° C.) allows them to be heated and stamped with a patterned shim. In contrast, other types of optical fiber have much higher softening points. For example, silica fiber has a softening point greater than approximately 1400° C., making the stamping process provided by conventional techniques difficult.

An embodiment herein provides a method for patterning rARSS in an optical fiber. In some embodiments herein, the rARSS may be patterned on a fiber through an etch process. In some embodiments herein, a pattern may be stamped on a fiber using a shim and a stamping procedure. Referring now to the drawings, and more particularly to FIGS. 1A through 6, where similar reference characters denote corresponding features consistently throughout the figures, there are shown preferred embodiments.

FIG. 1A is a SEM image of the end faces of fibers in a V-groove holder in an assembly 100 according to an embodiment herein. In an embodiment, the tips of fibers 102 are held in a holder. The holder, for example, may be one or more V-grooves 106, as shown in FIG. 1. In an embodiment, V-grooves 106 are grooves with a V-shaped cross section. Alternatively, in embodiments herein, the holder may be a groove having a cross section of any other shape. In an embodiment, the holder may be a glass capillary, which, in turn, is mounted, in a semicircular fixture. The fiber may be held in place with a suitable epoxy or other adhesive 108, and a cover glass 104 that may slide is placed on top of the assembly 100 to aid in holding the fibers 102 in place. In an embodiment, the adhesive or epoxy may be temporary or removable, to allow removal of the fibers after etching.

Figure 1B:
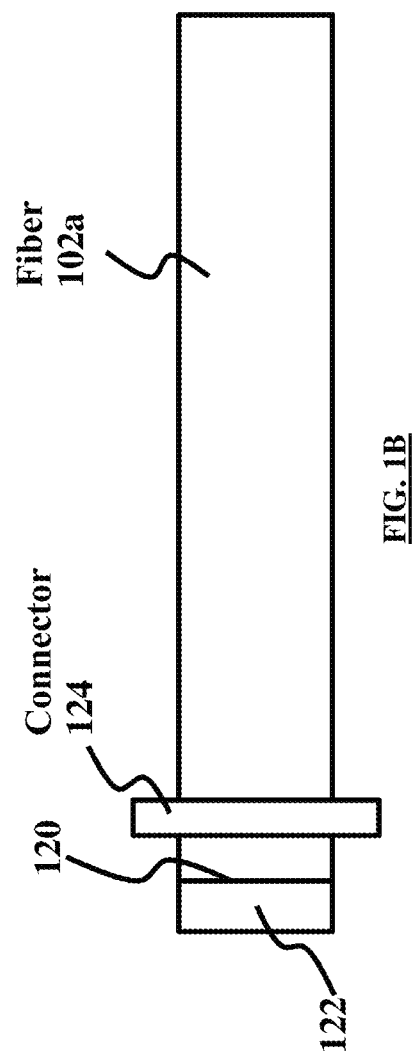
FIG. 1B is a schematic diagram illustrating an optical fiber according to an embodiment herein.

FIG. 1B, with reference to FIG. 1A, is a schematic diagram illustrating a fiber 102a according to an embodiment herein. The tip 120 of the fiber 102a may optionally be coated with a layer 122 of metal, which may be less than approximately 1,000 nm thick. In an embodiment, the metal may comprise any of gold (Au), silver (Ag), titanium (Ti), aluminum (Al), and chromium (Cr). In an embodiment, the assembly 100 is heated and then cooled in order to allow the metal to condense into fine droplets. The metal acts as an etch mask in order to help initiate surface texturing during patterning.

In an embodiment, the fiber 102a may be held by a connector 124. In an embodiment, the fiber 102a may be held by the connector 124 as an alternative to one of the V-grooves 106. The connector 124 may comprise any of the FC, FC-APC, SMA, ST, and other commercially available or custom-designed optical fiber connectors.

Figure 1C:
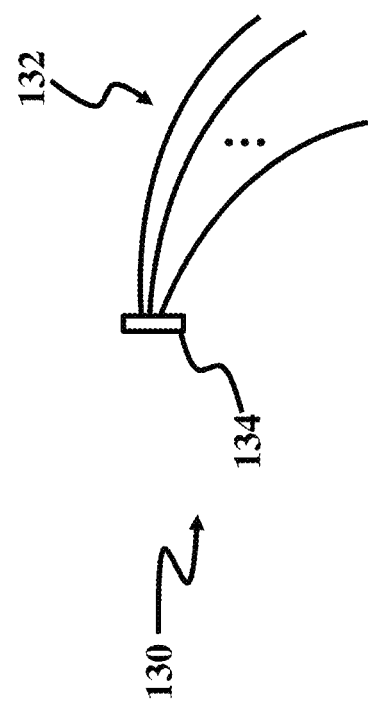
FIG. 1C is a schematic diagram illustrating a fiber bundle according to an embodiment herein.

FIG. 1C, with reference to FIGS. 1A and 1B, is a schematic diagram illustrating a fiber bundle 130. In an embodiment, fibers 132, in the fiber bundle 130, may be connected by a connector 134. In an exemplary embodiment, the fibers 132 may comprise a range of approximately 2 to 10,000 fibers in close proximity. In an embodiment, the fibers 132 may be fused or partially fused together. In an embodiment, the fibers 132 may be separate and held in place mechanically or with suitable epoxy. In an embodiment, the end face of the bundle may be polished, and ready to be patterned.

Figure 1D:
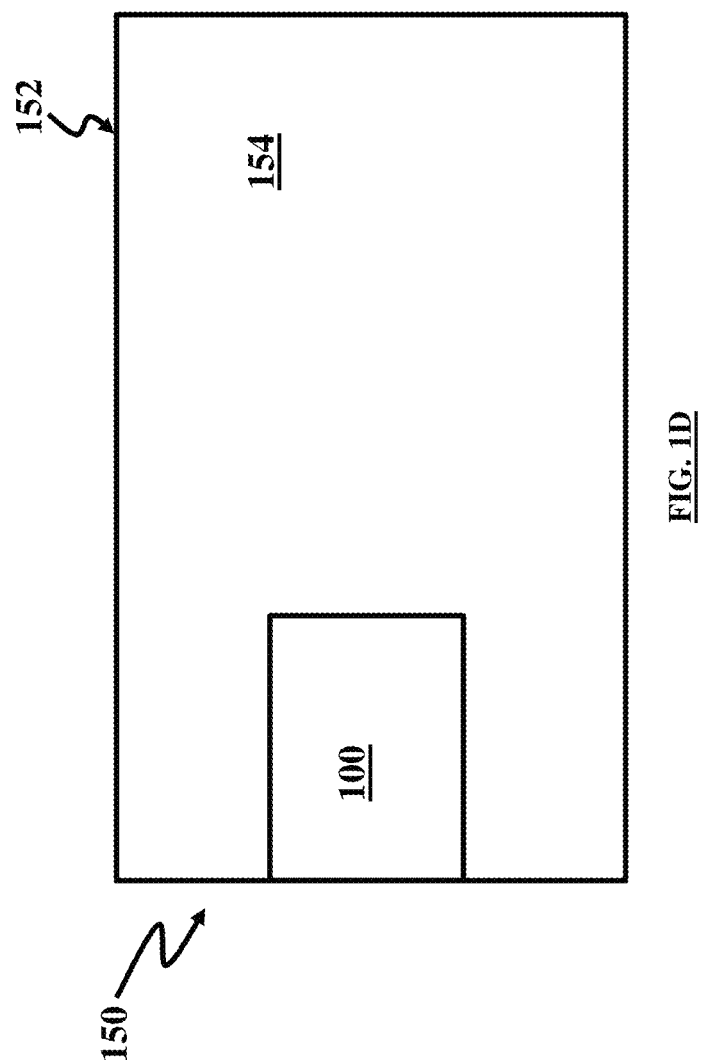
FIG. 1D is a schematic diagram illustrating a system for etching a surface of an optical fiber according to an embodiment herein.

FIG. 1D, with reference to FIGS. 1A and 1B, is a schematic diagram illustrating a system 150 according to an embodiment herein. In an embodiment, the assembly 100, including the fibers 102, may be placed in a reactive ion etch (RIE) system 152 with the fiber tips in the V-groove in a position where it will be exposed to plasma 154. In an embodiment, the fiber 102a may be placed in the RIE. In an embodiment, the fiber bundle 130 may be placed in the RIE. An etch process may then be carried out in the presence of suitable gases which may include any of fluoride ($F^-$), chloride ($Cl^-$), $C^{+4}$, oxide ($O^{-2}$), $B^{+3}$, sulfite ($S^{-2}$), and argon (Ar) ions. In an embodiment, an inductively coupled plasma (ICP) is used. The pressure of the plasma 154 may be maintained between approximately 15 and 100 mT, and the gas flow is maintained between approximately 20 and 150 sccm. Etching may be carried out until peak-to-valley surface roughness is between approximately 150 nm and 2 μm.

Figure 2:
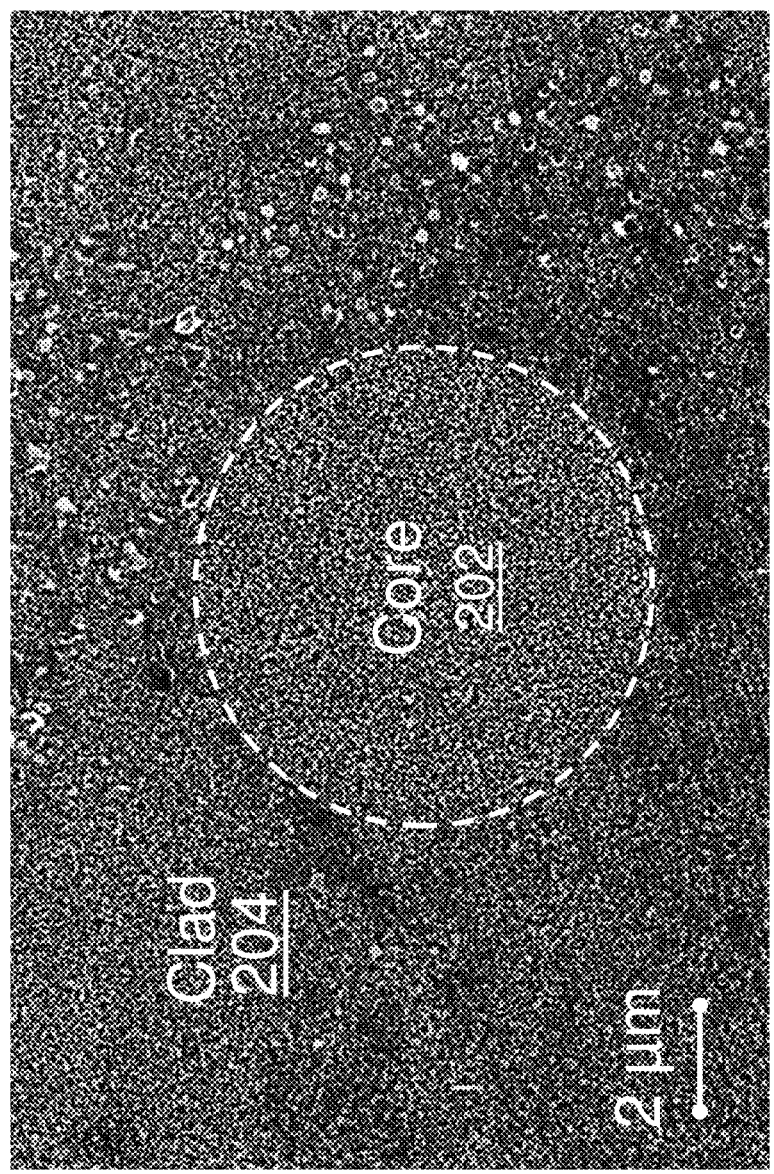
FIG. 2 is a SEM image of an etched optical fiber end face surface showing both the core and clad areas according to an embodiment herein.

FIG. 2, with reference to FIG. 1A and FIG. 1B, shows an SEM image of a surface morphology of the fiber end face after etching, according to an exemplary embodiment herein. FIG. 2 reveals a similar appearance for a core 202 and clad areas 204 of the fiber 200 (although the two regions are still distinguishable due to differences in the core and clad refractive indices, the dashed circle on FIG. 2 is added solely for illustration purposes and to generally show the boundary of the core 202).

In an exemplary embodiment, the fiber 200 comprises a single mode silica optical fiber (SMF28). In an exemplary embodiment herein, the fabrication of rARSS on the end faces of the single mode silica optical fiber (SMF28) 102 is achieved using the system 150 of FIG. 1B. For processing the fiber 200 in the RIE system 152, an end of the fiber 200 is mounted with epoxy or adhesive 108 in a V-groove of the V-grooves 106 of the assembly 100 as shown FIGS. 1A and 1B. The end of the fiber 200 is etched as described with reference to FIGS. 1A and 1B.

In an exemplary embodiment herein, the measured transmission per end face on a fiber with rARSS is increased to approximately 99.3% at approximately 780 nm wavelength, and approximately 99.4% at approximately 1,550 nm wavelength. This compares favorably to an untreated fiber, which has an end face transmittance of approximately 96.5% at these wavelengths.

In an exemplary embodiment herein, laser damage testing was performed at 1.06 μm on the end faces of the fiber 200 and untreated silica fibers. The laser parameters are a 20 nsec pulsewidth, a 20 Hz pulse repetition rate, and spot size of 8.7 μm (at $1/e^2$) which nearly matches the fiber core diameter (8.2 μm). A total of 600 laser shots irradiated the fiber end faces at increasing fluence until damage occurred. The results obtained, as summarized in Table 1, show remarkably high laser damage thresholds, up to 850 J/cm² for silica fiber end faces with ARSS, which approaches that of the untreated fiber.

TABLE 1

Laser damage threshold values at 1.06 μm for fused silica SMF28 optical fibers

| Fiber Array I.D. | Fiber Type | Threshold ($J \cdot cm^{-2}$) | Type of Damage |
|---|---|---|---|
| #00 | uncoated #1 | 650 | end-face |
| #00 | uncoated #2 | 1000 | end-face |
| #13 | ARSS #1 | 700 | end-face |
| #13 | ARSS #2 | 750 | end-face |
| #17 | ARSS #3 | 750 | end-face |
| #17 | ARSS #4 | 850 | end-face |

FIGS. 3A through 3D, with reference to FIGS. 1A through 2, are schematic diagrams illustrating systems for creating an ARSS pattern according to some embodiments herein. FIG. 3A illustrates an embodiment where the tip of a fiber 306 is placed in close proximity or contact with a patterned shim 302 with the fiber optionally held in a fiber connector 304. The textured shim 302 may be made from silicon or another metal or ceramic with a melting temperature higher than that of silica. The textured shim 302 may be coated with a release layer 308. The release layer 308 may comprise a material that does not adhere strongly to either the fiber 306 or the shim 302. In an exemplary embodiment, the release layer comprises any of boron nitride and molybdenum disulfide. In an embodiment, the release layer 308 comprises a thickness less than approximately 20 nm. In an embodiment, a force may be applied to the fiber 306 against the shim 302 using the fiber connector 304 when placed in close proximity or contact with the patterned shim 302.

FIG. 3B, with reference to FIG. 3A, is a schematic diagram illustrating a system 330 for creating an ARSS pattern according to some embodiments herein. In an embodiment, the tip of the fiber 306 may be heated with a laser beam 332. The fiber 306 may then be pressed against the shim 302 so that the pattern of the shim 302 is imprinted on the tip of the fiber 306.

The laser beam 332 is created by a laser source 334. In an embodiment, the laser source 302 comprises a $CO_2$ laser source that creates an emission at a wavelength of approximately 10.6 In another embodiment, other laser sources with a wavelength readily absorbed by the optical fiber 306 may be used. If the shim 302 is completely or partially transparent to the laser radiation 332 (e.g., 10.6 µm radiation passing through a silicon shim), it may be focused on the fiber tip through the shim 302 using a pair of lenses 336.

FIG. 3C, with reference to FIGS. 3A and 3B, is a schematic diagram illustrating a system 360 for creating an ARSS pattern according to some embodiments herein. In the system 360, a laser source 362 is located on the same side of the shim 302 as the fiber 306, and it produces a laser beam 364 that may be focused on the tip of the fiber 306 from an oblique angle. In an embodiment, the tip of the fiber 306 is heated for a sufficiently long enough period of time that the glass softens and conforms to the surface structure of the shim 302, thereby transferring the pattern from the shim 302 to the fiber 306. FIG. 3D, with reference to FIGS. 3A through 3C, is a schematic diagram illustrating the fiber 306 and the fiber connector 304 removed from the shim 302, resulting in a fiber face stamped with an ARSS pattern.

Embodiments provided herein may dramatically reduce surface reflections from a fiber end face. For example, using the embodiments herein, the reflection from a silica fiber end face is reduced from approximately 3.5% to less than approximately 0.1%. Using embodiments herein, the anti-reflective property of the component remains optically broadband, with low reflection over a spectral range that is typically greater than approximately 500 nm.

The embodiments herein provide reduced surface reflection that serves to increase fiber throughput and prevent back reflections that can be detrimental to the performance of lasers and other optical components. The embodiments herein further result in a significantly higher LIDT in comparison to an AR-coated fiber.

In an embodiment herein, the fiber used, for example the fiber 102, 200, 306 may comprise any of a silicate glass. In some embodiments, the fiber may comprise any of an oxide glass other than a silicate glass. The oxide glass may comprise any of aluminate, phosphate, germanate, tellurite, bismuthate, and antimonate glasses. In an embodiment herein, the fiber may comprise a halide glass. Halide glasses comprise any of halogen elements, including fluorine, chlorine, bromine, and iodine, or combinations thereof. In an embodiment herein, the fiber may comprise a chalcogenide glass. Chalcogenide glasses comprise any of chalcogen elements including sulfur, selenium, and tellurium, or combinations thereof.

In an embodiment herein, the fiber may comprise a single crystal rather than glass. The single crystal may be any optically transmissive crystalline material that is readily drawn into a fiber form. The crystalline material may comprise any of yttrium aluminum garnet (YAG), sapphire, magnesium aluminate spinel, gadolinium gallium garnet (GGG), and lithium niobate. In an embodiment, the ARSS as described herein may be fabricated on a fiber doped with rare earth ions of elements comprising any of cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), and ytterbium (Yb). In an embodiment herein, the ARSS may be fabricated on a fiber doped with transition metal ions of elements comprising titanium (Ti), vanadium (V), chromium (Cr), manganese (Mn), iron (Fe), cobalt (Co), and nickel (Ni).

In embodiments herein, the fiber 102, 200, 306 used may comprise an active or a passive optical fiber. In an embodiment, the fiber 102, 200, 306 may be removed from its holder, for example V-grooves 106 in FIG. 1A or fiber connector 304 in FIGS. 3A through 3D, after the ARSS patterning. The fiber 102, 200, 306 may then be connected or mounted in another holder.

FIG. 4A, with reference to FIGS. 1A through 3D, illustrates a fiber 400 with ARSS according to an embodiment herein. The fiber 400 comprises undoped sections 402 and 406, and a doped section 404. In an embodiment, the ARSS may be fabricated on the surface 408 of the undoped section 402. In an embodiment, the section 402 may be spliced or bonded onto the doped section 404.

FIG. 4B, with reference to FIGS. 1A through 4A, illustrates a fiber 420 with ARSS according to an embodiment herein. In an embodiment herein, the ARSS 424 may be patterned on a thin glass endcap 426. The endcap 426 may be attached to an untreated fiber 422 via fusion splicing or optical cement.

Figure 4C:
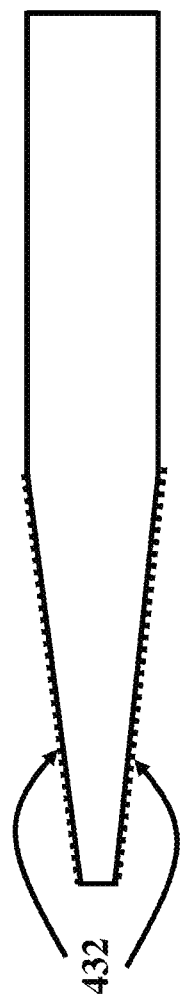
FIG. 4C is a schematic diagram illustrating an optical fiber with ARSS patterning according to still another embodiment herein.
Figure 4D:
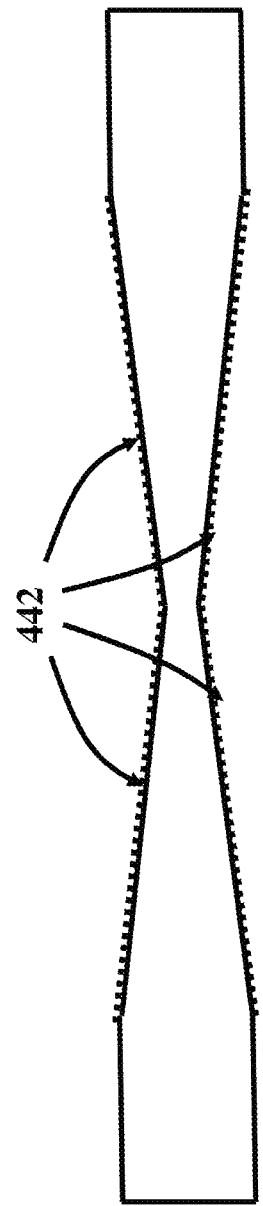
FIG. 4D is a schematic diagram illustrating an optical fiber with ARSS patterning according to still another embodiment herein.

FIG. 4C, with reference to FIGS. 1A through 4B, illustrates a fiber 430 with ARSS according to an embodiment herein. In an embodiment, the fiber 430 may be tapered to reduce its diameter, and an ARSS pattern 432 may be applied to the side rather than the end face of the fiber 430. This structure may couple light out of the fiber, serving to reduce cladding-coupled light, reduce transmission in higher order modes, or dump unabsorbed pump light. FIG. 4D, with reference to FIGS. 1A through 4C, illustrates a fiber 440 with ARSS according to an embodiment herein. In an embodiment, the fiber 440 may be tapered in the middle to reduce its diameter, and an ARSS pattern 442 may be applied to the tapered surface of the fiber 440.

In an embodiment, a fiber tip that is composed of either a silicate glass or non-silicate material could be coated with a film of silica, with a thickness greater than approximately 500 nm, and this film may subsequently be patterned according to any of the embodiments provided herein.

Figure 5:
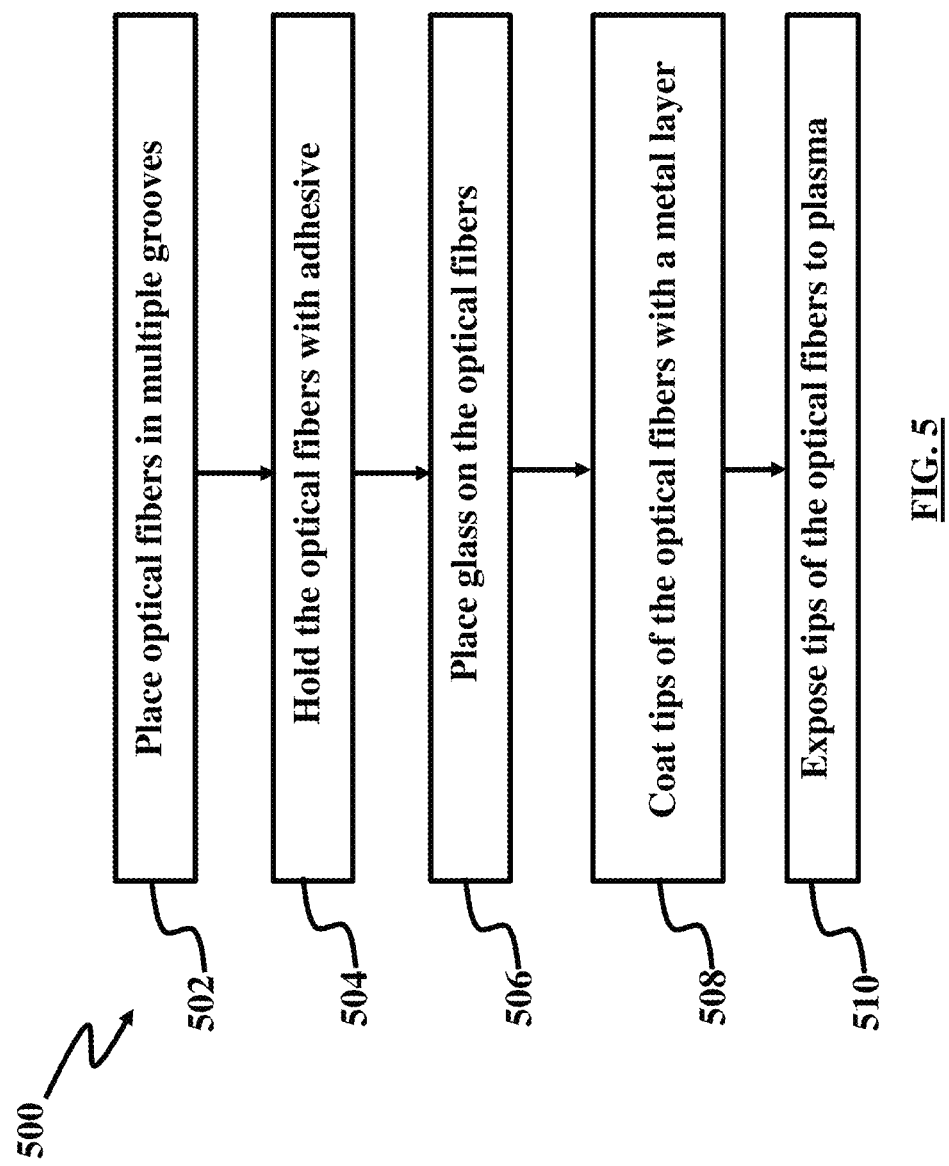
FIG. 5 is a flowchart illustrating a method according to an embodiment herein.

FIG. 5, with reference to FIGS. 1A through 1D, is a flowchart illustrating a method 500 for creating a rARSS pattern on optical fibers 102, according to an embodiment herein. At step 502, optical fibers 102 may be placed in one or more grooves 106. At step 504, the optical fibers 102 and held with adhesive 108. At step 506, the cover glass 104 may be placed on the optical fibers 102. At step 508, a tip 120 of the optical fiber 102a may be coated with the metal layer 122. The metal may comprise any of gold (Au), silver (Ag), titanium (Ti), aluminum (Al), and chromium (Cr). At step 510, the tips of the optical fibers may be exposed to plasma 154. The plasma may comprise any of fluoride ($F^-$), chloride ($Cl^-$), $C^{+4}$, oxide ($O^{-2}$), $B^{+3}$, sulfite ($S^{-2}$), and argon (Ar) ions.

Figure 6:
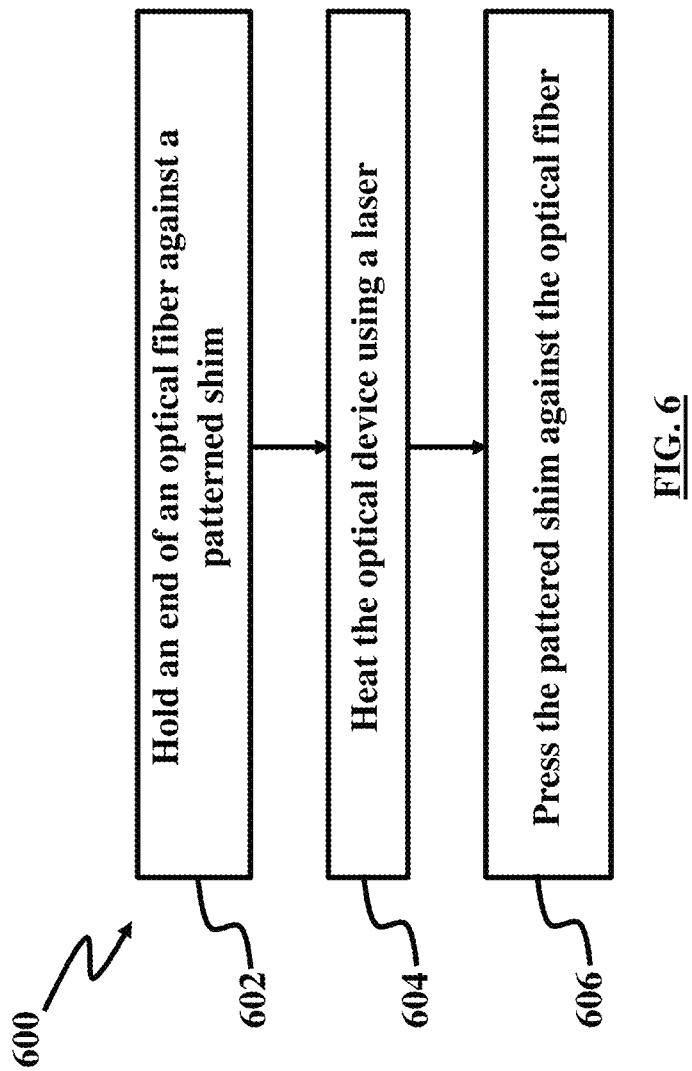
FIG. 6 is a flowchart illustrating a method according to another embodiment herein.

FIG. 6, with reference to FIGS. 3A through 3D, is a flowchart illustrating a method 600 for creating an ARSS pattern on an optical fiber. At step 602, the optical fiber 306 is held against the patterned shim 302. At step 604, the optical fiber 306 is heated using the laser 334. The laser 334 may be a $CO_2$ laser. At step 606, the pattered shim 308 is pressed against the optical fiber 306 to create the ARSS pattern. In an embodiment, methods 500 or 600 may be used to create the ARSS pattern using any of the assembly 100 in FIG. 1A and the fiber bundle 130 in FIG. 1C.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A method for creating a random anti-reflective surface structure on a plurality of optical fibers, said method comprising:

placing a plurality of optical fibers in a plurality of groves;
holding said plurality of optical fibers in place using an adhesive;
placing a glass on said plurality of optical fibers;
coating tips of said plurality of optical fibers with a layer of metal, wherein said metal comprises any of gold (Au), silver (Ag), titanium (Ti), aluminum (Al), and chromium (Cr); and
exposing said tips of said plurality of optical fibers to a plasma, wherein said plasma comprises any of fluoride ($F^-$), chloride ($Cl^-$), $C^{+4}$, oxide ($O^{-2}$), $B^{+3}$, sulfite ($S^{-2}$), and argon (Ar) ions.

2. The method of claim 1, wherein said plasma comprises an inductively coupled plasma (ICP).

3. The method of claim 1, wherein a pressure of said plasma is maintained between approximately 15 and 100 mT, and wherein a gas flow of said plasma is maintained between approximately 20 and 150 sccm.

* * * * *